(12) United States Patent
Tuniewicz et al.

(10) Patent No.: US 6,827,230 B1
(45) Date of Patent: Dec. 7, 2004

(54) SIDE OPENING RAIN TIGHT ELECTRICAL ENCLOSURE

(76) Inventors: Robert M. Tuniewicz, 14 Remsen Ct., Mt. Sinai, NY (US) 11766; Gilbert D. Talamo, P.O. Box 434, Great River, NY (US) 11739

( * ) Notice: Subject to any disclaimer, the term of this patent is extended or adjusted under 35 U.S.C. 154(b) by 149 days.

(21) Appl. No.: 10/218,218

(22) Filed: Aug. 13, 2002

(51) Int. Cl.$^7$ ................................................ H02G 3/08
(52) U.S. Cl. ...................... 220/3.8; 220/4.02; 220/811; 220/813; 174/50
(58) Field of Search ................................. 220/3.8, 4.02, 220/811, 813; 174/50

(56) References Cited

U.S. PATENT DOCUMENTS

| | | | | |
|---|---|---|---|---|
| 2,277,618 A | * | 3/1942 | Utter | 220/324 |
| 2,656,948 A | * | 10/1953 | McGee | 220/3.8 |
| 2,695,923 A | * | 11/1954 | LaJeunesse et al. | 174/52.1 |
| 2,742,173 A | * | 4/1956 | Janson | 220/3.8 |
| 2,877,919 A | * | 3/1959 | Kobryner | 220/3.8 |
| 4,548,330 A | * | 10/1985 | Hewitt et al. | 220/210 |
| 5,249,855 A | * | 10/1993 | Franklin et al. | 312/138.1 |

* cited by examiner

*Primary Examiner*—Joseph C. Merek
(74) *Attorney, Agent, or Firm*—Richard L. Miller

(57) ABSTRACT

A sidewards opening rain tight electrical enclosure including a box and a door pivotally and slidably mounted to the box by a hinge. The box has a front, a pair of side walls, and a top wall with a lip depending therefrom over, but slightly spaced away from, the front and the pair of side walls of the box so as to form a gap therebetween. The hinge allows the door to slide down relative to the box, pivot relative to the box onto the front of the box, and slide up relative to the box and be positioned in the gap for allowing the lip to prevent rain from entering behind the door. The box has a latch slidably mounted to the bottom wall thereof and extendable therefrom through the door so as to prevent the door from sliding back down relative to the box once closed.

12 Claims, 1 Drawing Sheet

SIDE OPENING RAIN TIGHT ELECTRICAL ENCLOSURE

BACKGROUND OF THE INVENTION

1. Field of the Invention

The present invention relates to an enclosure. More particularly, the present invention relates to a sidewards opening rain tight electrical enclosure.

2. Description of the Prior Art

Numerous innovations for electrical boxes have been provided in the prior art. Even though these innovations may be suitable for the specific individual purposes to which they address, however, they differ from the present invention in that they do not teach a sidewards opening rain tight electrical enclosure.

SUMMARY OF THE INVENTION

ACCORDINGLY, AN OBJECT of the present invention is to provide a sidewards opening rain tight electrical enclosure that avoids the disadvantages of the prior art.

ANOTHER OBJECT of the present invention is to provide a sidewards opening rain tight electrical enclosure that is simple to use.

BRIEFLY STATED, STILL YET ANOTHER OBJECT of the present invention is to provide a sidewards opening rain tight electrical enclosure including a box and a door pivotally and slidably mounted to the box by a hinge. The box has a front, a pair of side walls, and a top wall with a lip depending therefrom over, but slightly spaced away from, the front and the pair of side walls of the box so as to from a gap therebetween. The hinge allows the door to slide down relative to the box, pivot relative to the box onto the front of the box, and slide up relative to the box and be positioned in the gap for allowing the lip to prevent rain from entering behind the door. This arrangement allows the door to be integrally formed with hinge thereby eliminating the need for separately attached hinge components. The box has a latch slidably mounted to the bottom wall thereof and extendable therefrom through the door so as to prevent the door from sliding back down relative to the box once closed.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

Figure 1:
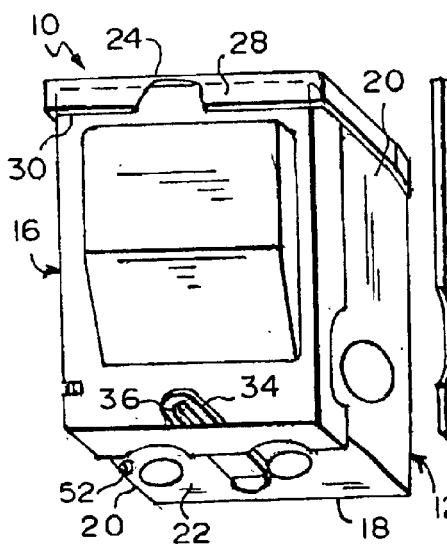
FIG. 1 is a diagrammatic perspective view of the prevent invention in the closed position.

List of Reference Numerals Utilized in the Drawing 10 sidewards opening rain tight electrical enclosure of present invention
12 box
14 front of box 12
16 door
18 rear wall of box 12
20 pair of side wells of box 12
22 bottom wall of box 12
24 top wall of box 12
28 lip depending from top wall 24 of box 12
30 gap between lip 29 depending from top wall 24 of box 12 and front 14 of box 12 and pair of side walls 20 of box 12
32 hinge pivotally and slidably mounting door 16 to one side wall 20 of box 12
34 latch of box 12
36 throughbore in latch 34 of box 12 for receiving pad lock or like is (not shown)
38 tube formed along edge 40 of door 16 of hinge
40 edge of door 16 of hinge
42 blindbore in top wall 24 of box 12 of hinge
44 plate of bottom wall 22 of box 12 of hinge
46 pivot rod of hinge
48 reduced lower end of pivot rod 46 of hinge
50 upper end of pivot rod 46 of hinge
52 pair of screws
54 pair of throughbores in bottom wall 22 of body 12
56 pair of threaded throughbores in plate 44
58 tab of plate 44
60 throughbore in plate 44

DETAILED DESCRIPTION OF THE PREFERRED EMBODIMENT

Figure 2:
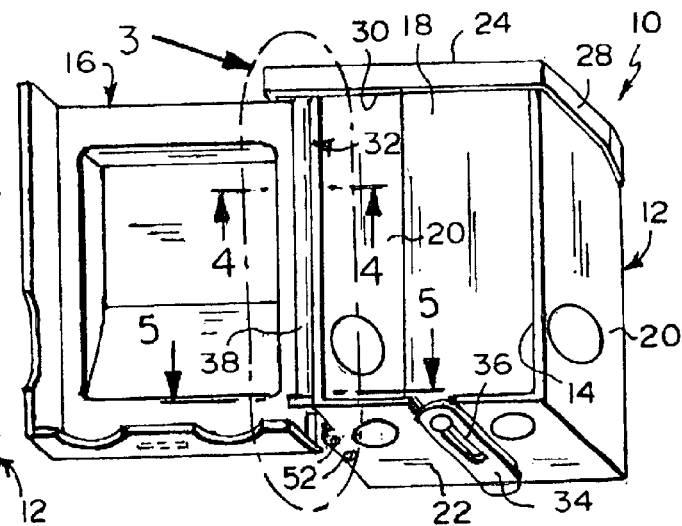
FIG. 2 is a diagrammatic perspective view of the present invention in the open position.

Referring now to the figures, in which like numerals indicate like parts, and particularly to FIGS. 1 and 2, the sidewards opening rain tight electrical enclosure of the present invention is shown generally at 10.

The sidewards opening rain tight electrical enclosure 10 comprises a box 12 that has a front 14 that is open, and a door 16 that is movably mounted to the box 12 and selectively closes the front 14 of the box 12.

The box 12 has a rear wall 18, a pair of side walls 20, a bottom wall 22, and a top wall 24.

The top wall 24 of the box 12 has a lip 28. The lip 28 depends from the top wall 24 of the box 12 over, but is slightly spaced away from, the front 14 of the box 12 and the pair of side walls 20 of the box 12 so as to from a gap 30 therebetween.

The door 16 is pivotally and slidably mounted to one side wall 20 of the box 12 by a hinge. The hinge allows the door 16 to slide down relative to the box 12, pivot relative to the box 1 onto the front 14 of the box 12, and slide up relative to the box 12 and be positioned in the gap 30 for allowing the lip 28 to prevent rain from entering behind the door 16 so as to be rain tight.

The box 12 further has a latch 34. The latch 34 is slidably mounted to the bottom wall 22 of the box 12 and is extendable therefrom through the door 16 so as to prevent the door 16 from sliding back down relative to the box 12 once closed.

The latch 34 has a throughbore 36. The throughbore 36 in the latch 34 is for receiving a pad lock or the like (not shown) that is positioned outside the door 16 and therefore prevents the door 16 from opening.

Figure 4:
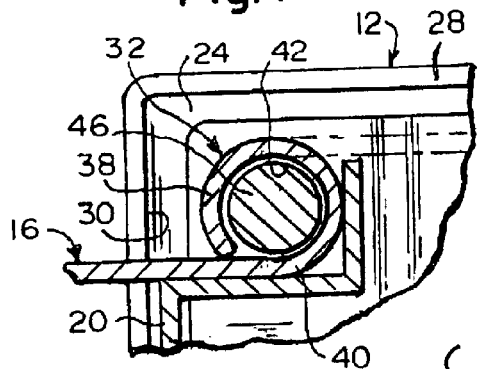
FIG. 4 is an enlarged diagrammatic cross sectional view taken along line 4—4 in FIG. 2.
Figure 3:
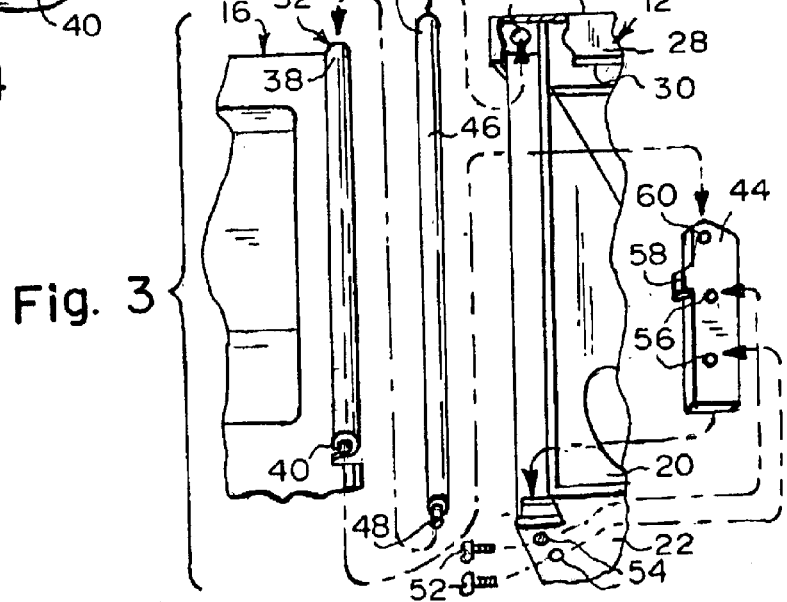
FIG. 3 is an enlarged exploded diagrammatic perspective view of the area generally enclosed by the dotted curve identified by arrow 3 in FIG. 2.

The specific configuration of the hinge can best be seen in FIGS. 3 and 4, and as such, will be discussed with reference thereto.

The hinge comprises the door 16 having a tube 38 formed along an edge 40 thereof.

The hinge further comprises the top wall 24 of the box 12 having a blindbore 42, and the bottom wall 22 of the box 12 having a plate 44.

The hinge further comprises a pivot rod 46. The pivot rod 46 has a reduced lower end 48 and an upper end 50.

The pivot rod 46 is freely received in the tube 39 of the door 16 so as to allow the door 16 to slide up and down relative thereto and pivot relative thereto.

The upper end 50 of the pivot rod 46 is rotatably received in the blindbore 42 in the top wall 24 of the box 12, while the reduced lower end 48 of the pivot rod 46 is rotatably received in the plate 44 of the bottom wall 22 of the box 12.

Figure 5:
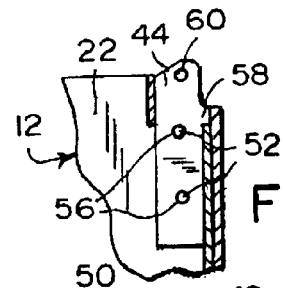
FIG. 5 is an enlarged diagrammatic cross sectional view taken along line 5—5 in FIG. 2.

The specific configuration of the plate 44 can bast be seen in FIGS. 3 and 5, and as such, will be discussed with reference thereto.

The plate 44 lays along the bottom wall 22 of the box 12, and is replaceably maintained therealong by a pair of screws 52. The pair of screws 52 pass through a pair of throughbores 54 in the bottom wall 22 of the body 12 and threadably into a pair of threaded throughbores 56 in the plate 44.

The plate 44 has a tab 58. The cab 58 extends laterally outwardly from the plate 44 and engages a side wall 20 of the body 12 so as to be captured for holding in place while the pair of screws 52 are threaded.

The plate 44 further has a throughbore 60. The throughbore 60 rotatably receives the reduced lower end 48 of the pivot rod 46. This arrangement allows a tube to be integrally formed along the edge 40 of door 16 of hinge 32 thereby eliminating the need for separately attached hinge components.

It will be understood that each of the elements described above, or two or more together, may also find a useful application in other types of constructions differing from the types described above.

While the invention has been illustrated and described as embodied in a sidewards opening rain tight electrical enclosure, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A sidewards opening rain tight electrical enclosure, comprising:
   a) a box; and
   b) a door;
   wherein said box has a front;
   wherein said front said box is open;
   wherein said door is movably mounted to said box; and
   wherein said door selectively closes said front of said box, wherein said box has a rear wall;
   wherein said box has a pair of side walls;
   wherein said box has a bottom wall; and
   wherein said box has a top wall, wherein said top wall of said box has a lip; and
   wherein said lip depends from said top wall of said box over, but is slightly spaced away from, said front of said box and said pair of side walls of said box so as to form a gap therebetween, wherein said door is pivotally and slidably mounted to one side wall of said box by a hinge, wherein said hinge comprises said door having a tube; and
   wherein said tube is formed along an edge of said door and wherein said hinge comprises said top wall of said box having a blindbore and said bottom wall of said box having a plate.

2. The enclosure as defined in claim 1, wherein said hinge allows said door to slide down relative to said box, pivot relative to said box onto said front of said box, and slide up relative to said box and be positioned in said gap for allowing said lip to prevent rain from entering behind said door so as to be rain tight.

3. The enclosure as defined in claim 1, wherein said box has a latch;
   wherein said) latch is slidably mounted to said bottom wall of said box; and
   wherein said latch is extendable through said door so as to prevent said door from sliding back down relative to said box once closed.

4. The enclosure as defined in claim 1, wherein said latch has a throughbore;
   wherein said throughbore in said latch is for receiving a pad lock or the like; and
   wherein said pad lock or the like is positioned outside said door and therefore prevents said door from opening.

5. The enclosure as defined in claim 1, wherein said hinge comprises a pivot rod;
   wherein said pivot rod has a reduced lower end; and
   wherein said pivot rod has an upper end.

6. The enclosure as defined in claim 5, wherein said pivot rod is freely received in said tube of said door so as to allow said door to slide up and down relative thereto and pivot relative thereto.

7. The enclosure as defined in claim 5, wherein said upper end of said pivot rod is rotatably received in said blindbore in said top wall of said box; and
   wherein said reduced lower end of said pivot rod is rotatably received in said plate of said bottom wall of said box.

8. The enclosure as defined in claim 1, wherein said plate lays along said bottom wall of said box.

9. The enclosure as defined in claim 8, wherein said plate is replaceably maintained along said bottom wall of said body by a pair of screws.

10. The enclosure as defined in claim 9, wherein said pair of screws pass through a pair of throughbores in said bottom wall of said body and threadably into a pair of threaded throughbores in said plate.

11. The enclosure as defined in claim 9, wherein said plate has a tab;
    wherein said tab extends laterally outwardly from said plate; and
    wherein said tab engages a side wall of said body so as to be captured for holding in place while said pair of screws are threaded.

12. The enclosure as defined in claim 5, wherein said plate has a throughbore; and
    wherein said throughbore in said plate rotatably receives said reduced lower end of said pivot rod.

\* \* \* \* \*